US012722588B2

(12) United States Patent
Rehfeld et al.

(10) Patent No.: US 12,722,588 B2
(45) Date of Patent: Sep. 1, 2026

(54) LIGHT-BASED OCCUPANT DETECTION FOR AIRBAG DEPLOYMENT

(71) Applicant: Aptiv Technologies AG, Schaffhausen (CH)

(72) Inventors: Timo Rehfeld, Cologne (DE); Alexander Barth, Wermelskirchen (DE); Xuebing Zhang, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 72 days.

(21) Appl. No.: 18/663,658

(22) Filed: May 14, 2024

(65) Prior Publication Data

US 2025/0256672 A1 Aug. 14, 2025

Related U.S. Application Data

(63) Continuation-in-part of application No. 17/933,178, filed on Sep. 19, 2022.

(60) Provisional application No. 63/552,556, filed on Feb. 12, 2024, provisional application No. 63/246,607, filed on Sep. 21, 2021.

(51) Int. Cl.
*B60R 21/015* (2006.01)
*G06V 20/59* (2022.01)
*G06V 40/10* (2022.01)

(52) U.S. Cl.
CPC ........ *B60R 21/01538* (2014.10); *G06V 20/59* (2022.01); *G06V 40/10* (2022.01)

(58) Field of Classification Search
CPC ....... G06V 20/59; G06V 20/593; G06V 40/10
See application file for complete search history.

(56) References Cited

U.S. PATENT DOCUMENTS 5,983,147 A * 11/1999 Krumm .................. G06V 40/10
701/28
6,801,662 B1 10/2004 Owechko
(Continued)

FOREIGN PATENT DOCUMENTS

WO 2020165908 A2 8/2020

OTHER PUBLICATIONS

Extended European Search Report for EP24183672.5 dated Dec. 23, 2024, 11 pages.
(Continued)

*Primary Examiner* — Erick R Solis
(74) *Attorney, Agent, or Firm* — Miller Johnson

(57) ABSTRACT

A system for detecting occupants of a vehicle includes memory hardware configured to store instructions and processor hardware configured to execute the instructions. The instructions include, based on an outcome of a first set of criteria, associating image data with a first set of scores. The first set of scores includes a first score and a second score. The instructions include, based on an outcome of a second set of criteria, associating the data with a second set of scores. The instructions include combining the first set of scores and the second set of scores, including determining a first metric and determining a second metric. The instructions include comparing the first metric and the second metric. The instructions include, in response to a determination that the first metric is greater than the second metric, organizing the data into a first category and activating an airbag of the vehicle.

22 Claims, 12 Drawing Sheets

(56) References Cited

U.S. PATENT DOCUMENTS

| | | | | | |
|---|---|---|---|---|---|
| 7,386,372 | B2 * | 6/2008 | Breed | B60R 21/01536 701/1 |
| 2003/0036835 | A1 * | 2/2003 | Breed | G06V 40/10 701/45 |
| 2006/0161321 | A1 * | 7/2006 | Bothe | B60N 2/0026 701/45 |
| 2007/0086624 | A1 * | 4/2007 | Breed | B60R 21/01552 382/104 |
| 2019/0299895 | A1 | 10/2019 | Herbert | |
| 2022/0114817 | A1 | 4/2022 | Gronau | |
| 2022/0398765 | A1 * | 12/2022 | Tomatsu | G06V 40/10 |
| 2023/0034624 | A1 | 2/2023 | Heift | |
| 2023/0107819 | A1 | 4/2023 | Klaus | |

OTHER PUBLICATIONS

Cruz et al., "SVIRO: Synthetic Vehicle Interior Rear Seat Occupancy Dataset and Benchmark," IEEE Winter Conference on Applications of Computer Vision, pp. 973-982 2020.

Redmon et al., "You only look once: Unified, real-time object detection," In Proceedings of the IEEE conference on computer vision and pattern recognition, pp. 779-788 2016.

Y. Gu and A. Leshem, "Robust adaptive beamforming based on interference covariance matrix reconstruction and steering vector estimation," IEEE Trans. Signal Process., vol. 60, No. 7, pp. 3881-3885, Jul. 2012.

Y. Gu, N. A. Goodman, S. Hong, and Y. Li, "Robust adaptive beamforming based on interference covariance matrix sparse reconstruction," Signal Process., vol. 96, part. B, pp. 375-381, Mar. 2014.

Y. Gu, N. A. Goodman, and Y. D. Zhang, "Adaptive beamforming via sparsity-based reconstruction of covariance matrix," in A. De Maio, Y. C. Eldar, and A. Haimovich (eds.), Compressed Sensing in Radar Signal Processing, Cambridge, UK: Cambridge Univ. Press, 33 pages, 2019.

Koch et al., "Siamese Neural Networks for One-shot Image Recognition," Department of Computer Science, University of Toronto, 2015.

Zhou et al., "A Robust and Efficient Algorithm for Coprime Array Adaptive Beamforming," IEEE Transations on Vehicular Technology, vol. 67, No. 2, Feb. 2018.

Huang, Shih-Shinh & Hsiao, Pei-Yung. (2010). Occupant classification for smart airbag using Bayesian filtering. 1st International Conference on Green Circuits and Systems, ICGCS 2010. 660-665. 10.1109/ICGCS.2010.5542979.

* cited by examiner

Condition A: Leaving car possible?

Condition B: Confidence for new state higher than confidence for current state by more than threshold Condition C: Time in current state above threshold Condition D: State Status = 'Init/Unknown'

LIGHT-BASED OCCUPANT DETECTION FOR AIRBAG DEPLOYMENT

CROSS-REFERENCE TO RELATED APPLICATIONS

This application is a continuation-in-part of U.S. patent application Ser. No. 17/933,178 filed Sep. 19, 2022, which claims the benefit of U.S. Provisional Application No. 63/246,607 filed Sep. 21, 2021. This application claims the benefit of U.S. Provisional Application No. 63/552,556 filed Feb. 12, 2024, the entire disclosure of which is incorporated by reference.

FIELD

The present disclosure relates to interior vehicle sensors, and more particularly to occupant detection for airbag engagement and deployment.

BACKGROUND

Vehicle airbags are an important safety system in modern vehicles and the accurate activation and deployment of airbags is crucial. Airbags are designed to deploy when an impact is detected. To avoid unnecessary or even dangerous deployments, airbags are not always active. For example, occupant weight, seat location, and the presence of child safety seats can be used to determine if an airbag should deploy in the event of a crash and/or impact.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system for detecting occupants of a vehicle includes memory hardware configured to store instructions and processor hardware configured to execute the instructions. The instructions include receiving data from a set of sensors. The set of sensors includes a first camera. The data includes image information from the first camera. The instructions include, based on an outcome of a first set of criteria, associating the data with a first set of scores. The first set of scores includes a first score associated with a first occupancy state and a second score associated with a second occupancy state. The instructions include, based on an outcome of a second set of criteria, associating the data with a second set of scores. The instructions include combining the first set of scores and the second set of scores. The instructions include determining a first metric based on scores associated with the first occupancy state and determining a second metric based on scores associated with the second occupancy state. The instructions include comparing the first metric and the second metric. The instructions include, in response to a determination that the first metric is greater than the second metric, organizing the data into a first category and activating an airbag of the vehicle.

In other features, the second set of scores includes a third score associated with the first occupancy state and a fourth score associated with the second occupancy state. In other features, determining the first metric includes summing the scores associated with the first occupancy state. In other features, determining the second metric includes summing the scores associated with the second occupancy state. In other features, a field of view associated with the first camera includes a position corresponding to a driver of the vehicle.

In other features, the first set of scores includes a first quantity of scores associated with the first occupancy state. In other features, the second set of scores includes a second quantity of scores associated with the first occupancy state. The first quantity and the second quantity are different. In other features, combining the first set of scores and the second set of scores includes normalizing the first set of scores and the second set of scores before determining the first metric and the second metric.

In other features, the instructions include, in response to a determination that the first metric is within threshold range of the second metric, organizing the data into a second category. In other features, the instructions include, in response to a determination that the second metric is greater than the first metric, organizing the data into a third category and forgoing activation of the airbag.

In other features, the first set of criteria and the second set of criteria include a presence of a face, a detected object, a detected object that meets a set of size and/or shape criteria, a presence of a person, a presence of a person above a threshold size, a presence of a person in a front seat of the vehicle, and/or a presence of a person in a rear seat of the vehicle.

In other features, the first set of scores and the second set of scores include a score associated with a third occupancy state, a score associated with a fourth occupancy state, a score associated with a fifth occupancy state, a score associated with a sixth occupancy state, and a score associated with a seventh occupancy state.

A method for detecting occupants of a vehicle includes receiving data from a set of sensors. The set of sensors includes a first camera. The data includes image information from the first camera. The method includes, based on an outcome of a first set of criteria, associating the data with a first set of scores. The first set of scores includes a first score associated with a first occupancy state and a second score associated with a second occupancy state. The method includes, based on an outcome of a second set of criteria, associating the data with a second set of scores. The method includes combining the first set of scores and the second set of scores. The method includes determining a first metric based on scores associated with the first occupancy state and determining a second metric based on scores associated with the second occupancy state. The method includes comparing the first metric and the second metric. The method includes, in response to a determination that the first metric is greater than the second metric, organizing the data into a first category and activating an airbag of the vehicle.

In other features, the second set of scores includes a third score associated with the first occupancy state and a fourth score associated with the second occupancy state. In other features, determining the first metric includes summing the scores associated with the first occupancy state. In other features, determining the second metric includes summing the scores associated with the second occupancy state. In other features, a field of view associated with the first camera includes a position corresponding to a driver of the vehicle. In other features, the first set of scores includes a first quantity of scores associated with the first occupancy state. In other features, the second set of scores includes a second quantity of scores associated with the first occupancy state. The first quantity and the second quantity are different.

In other features, combining the first set of scores and the second set of scores includes normalizing the first set of scores and the second set of scores before determining the first metric and the second metric.

In other features, the method includes, in response to a determination that the first metric is within threshold range of the second metric, organizing the data into a second category. In other features, the method includes, in response to a determination that the second metric is greater than the first metric, organizing the data into a third category and forgoing activation of the airbag. In other features, the first set of criteria and the second set of criteria include a presence of a face, a detected object, a detected object that meets a set of size and/or shape criteria, a presence of a person, a presence of a person above a threshold size, a presence of a person in a front seat of the vehicle, and/or a presence of a person in a rear seat of the vehicle. In other features, the first set of scores and the second set of scores include a score associated with a third occupancy state, a score associated with a fourth occupancy state, a score associated with a fifth occupancy state, a score associated with a sixth occupancy state, and a score associated with a seventh occupancy state.

A non-transitory computer-readable storage medium stores process-executable instructions for detecting occupants of a vehicle. The instructions include receiving data from a set of sensors. The set of sensors includes a first camera. The data includes image information from the first camera. The instructions include, based on an outcome of a first set of criteria, associating the data with a first set of scores. The first set of scores includes a first score associated with a first occupancy state and a second score associated with a second occupancy state. The instructions include, based on an outcome of a second set of criteria, associating the data with a second set of scores. The instructions include combining the first set of scores and the second set of scores, The instructions include determining a first metric based on scores associated with the first occupancy state, and determining a second metric based on scores associated with the second occupancy state. The instructions include comparing the first metric and the second metric. The instructions include, in response to a determination that the first metric is greater than the second metric, organizing the data into a first category and activating an airbag of the vehicle.

In other features, the second set of scores includes a third score associated with the first occupancy state and a fourth score associated with the second occupancy state. In other features, determining the first metric includes summing the scores associated with the first occupancy state. In other features, determining the second metric includes summing the scores associated with the second occupancy state. In other features, a field of view associated with the first camera includes a position corresponding to a driver of the vehicle. In other features, the first set of scores includes a first quantity of scores associated with the first occupancy state. In other features, the second set of scores includes a second quantity of scores associated with the first occupancy state. The first quantity and the second quantity are different. In other features, combining the first set of scores and the second set of scores includes normalizing the first set of scores and the second set of scores before determining the first metric and the second metric.

In other features, the instructions include, in response to a determination that the first metric is within threshold range of the second metric, organizing the data into a second category. In other features, the instructions include, in response to a determination that the second metric is greater than the first metric, organizing the data into a third category and forgoing activation of the airbag. In other features, the first set of criteria and the second set of criteria include a presence of a face, a detected object, a detected object that meets a set of size and/or shape criteria, a presence of a person, a presence of a person above a threshold size, a presence of a person in a front seat of the vehicle, and/or a presence of a person in a rear seat of the vehicle. In other features, the first set of scores and the second set of scores include a score associated with a third occupancy state, a score associated with a fourth occupancy state, a score associated with a fifth occupancy state, a score associated with a sixth occupancy state, and a score associated with a seventh occupancy state.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1A:
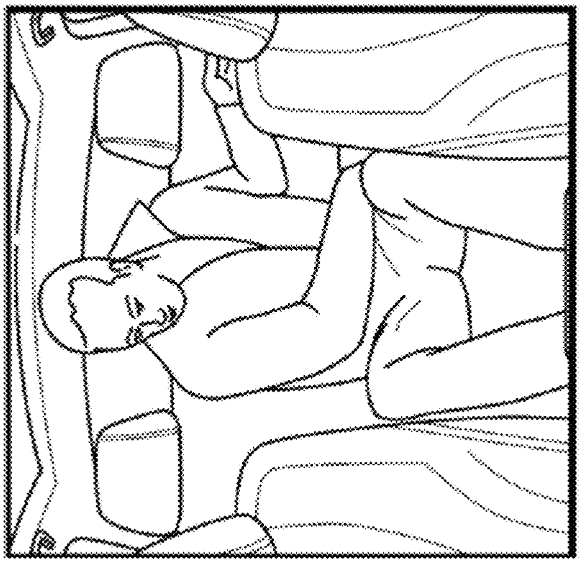
FIGS. 1A-1D are examples of objects and passengers in a vehicle.
Figure 1B:
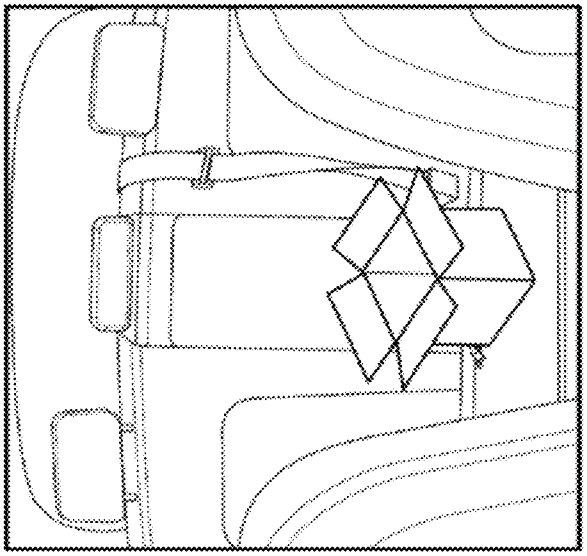
Figure 1C:
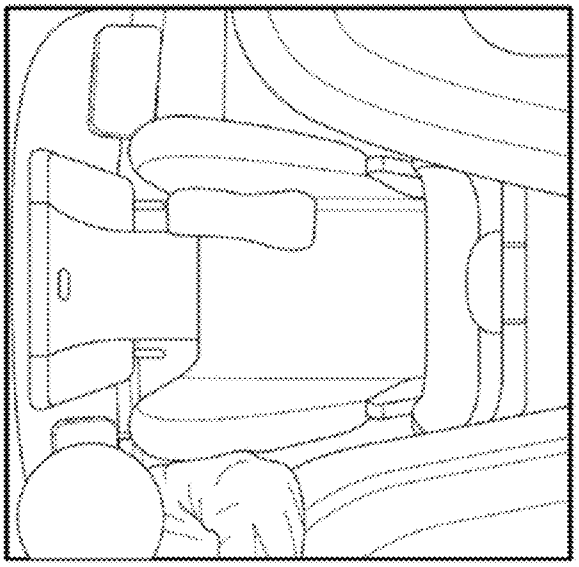
Figure 1D:
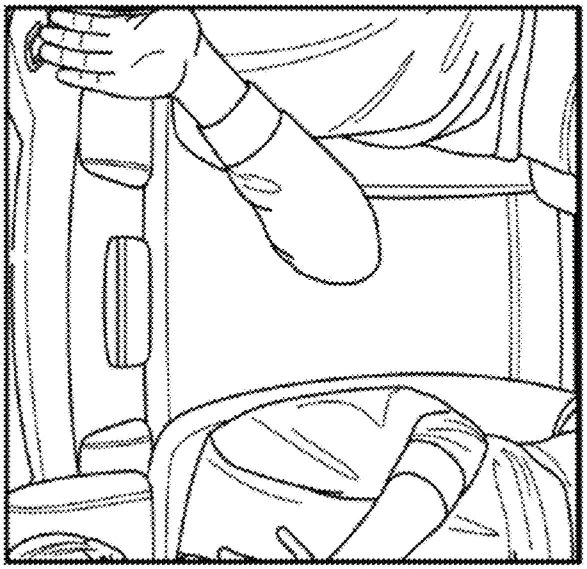

The present disclosure describes a method and system for determining whether to activate an airbag in a vehicle. The proposed method relies on vehicle sensor data (such as weight sensors, seat belt detectors, and/or cabin facing cameras). The proposed method allows multiple machine vision algorithms (for detecting vehicle occupants) to be used at once, which allows for higher accuracy detection. In the proposed method, each algorithm can cast multiple "votes" related to what the algorithm detects based on image data from a cabin facing camera. The various votes based on algorithm observations are combined into a histogram to determine the most likely occupant of a seat (for example, empty, object, child seat, child in child seat, child, adult, or a person of unknown size). In FIG. 1A an adult is in the back seat of a vehicle. In FIG. 1B, an object is in the back seat of a vehicle. In FIG. 1C, an empty child seat is in the back seat of a vehicle. In FIG. 1D the back seat is empty and two adults are in the front seats of the vehicle. In some implementations, the weight of each algorithm is equal. In some implementations, some algorithms are weighted more heavily than others.

Figure 2:
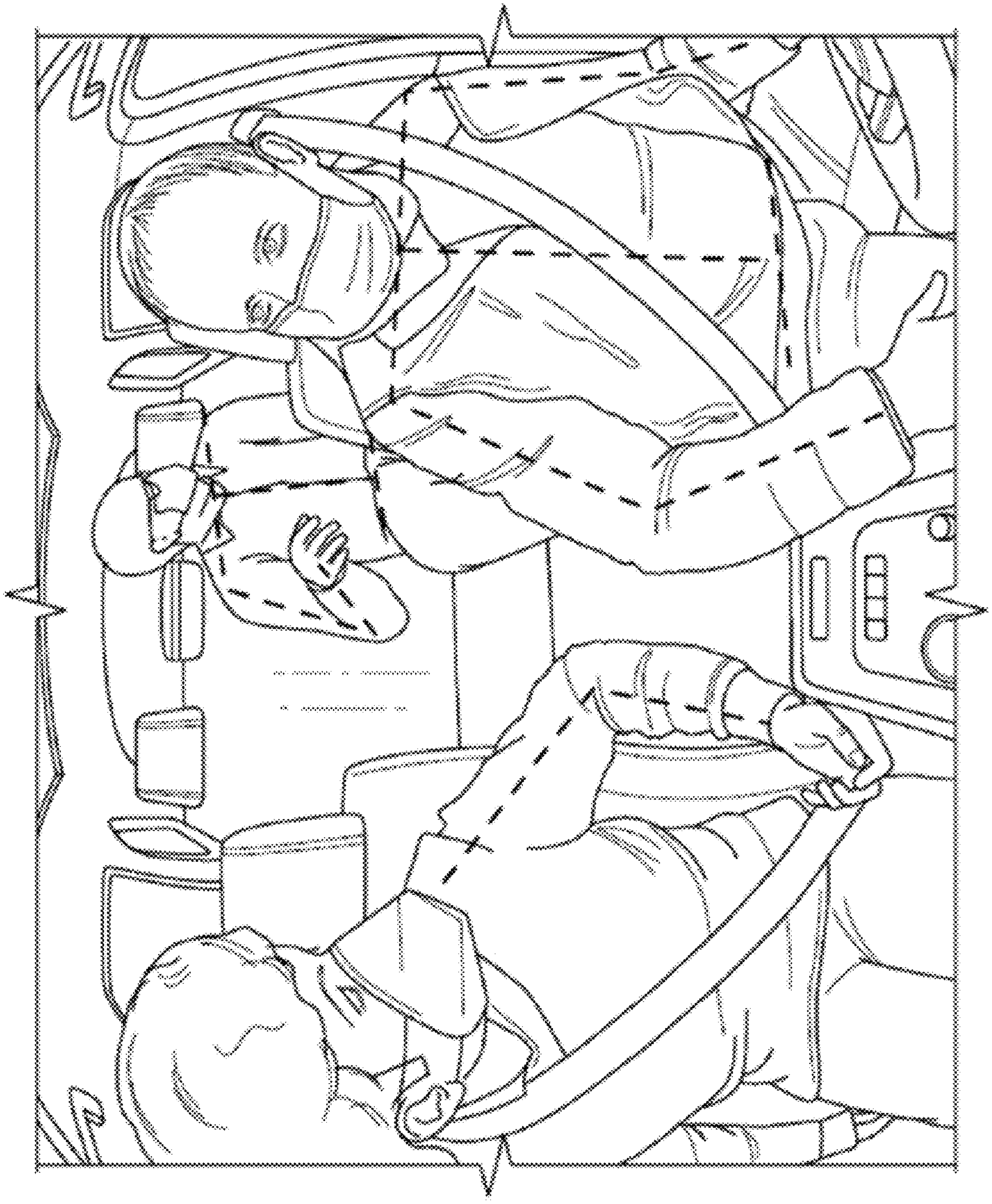
FIG. 2 is an example of key body points detection in a vehicle.
Figure 3:
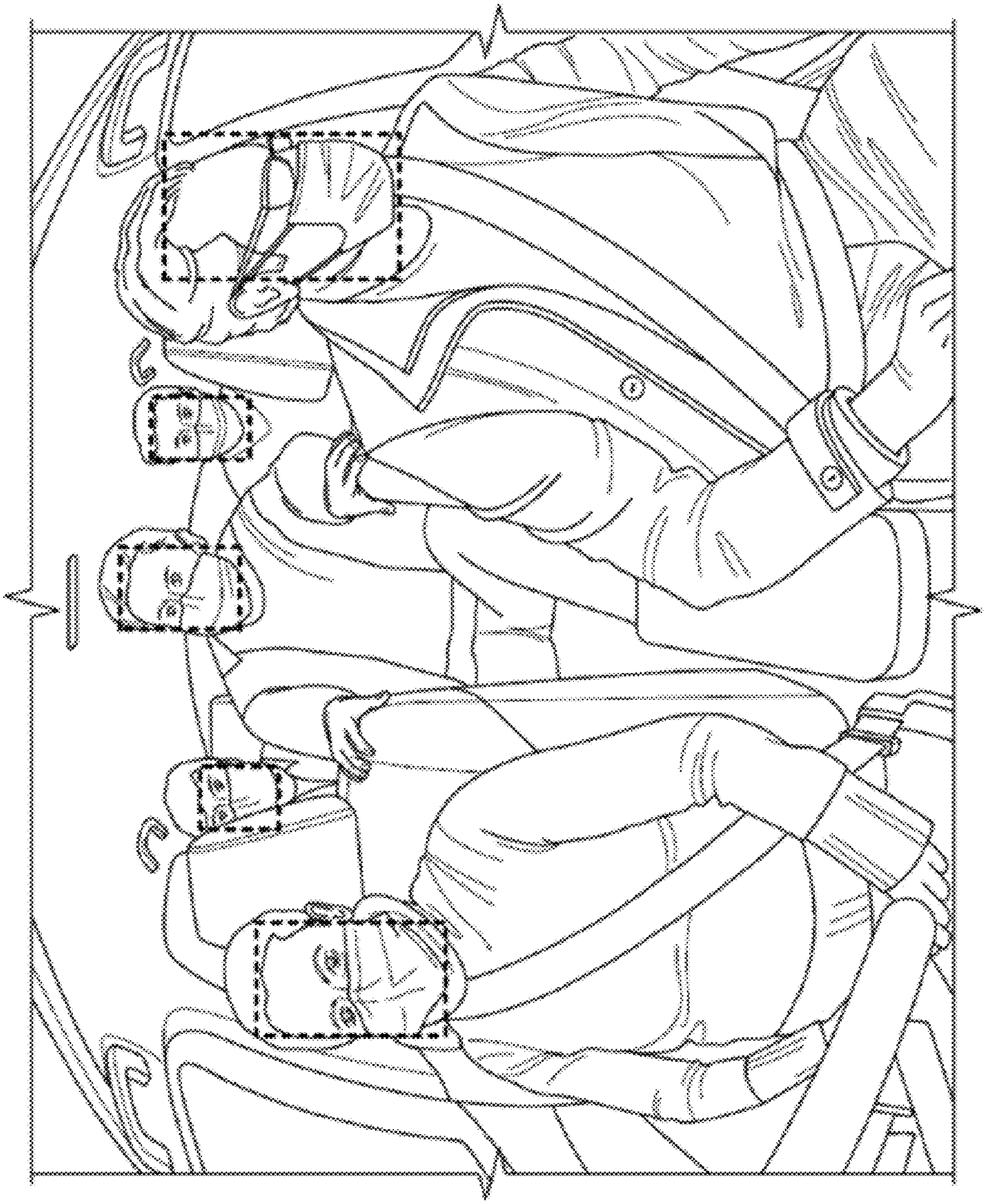
FIG. 3 is an example of face detection in a vehicle.
Figure 4:
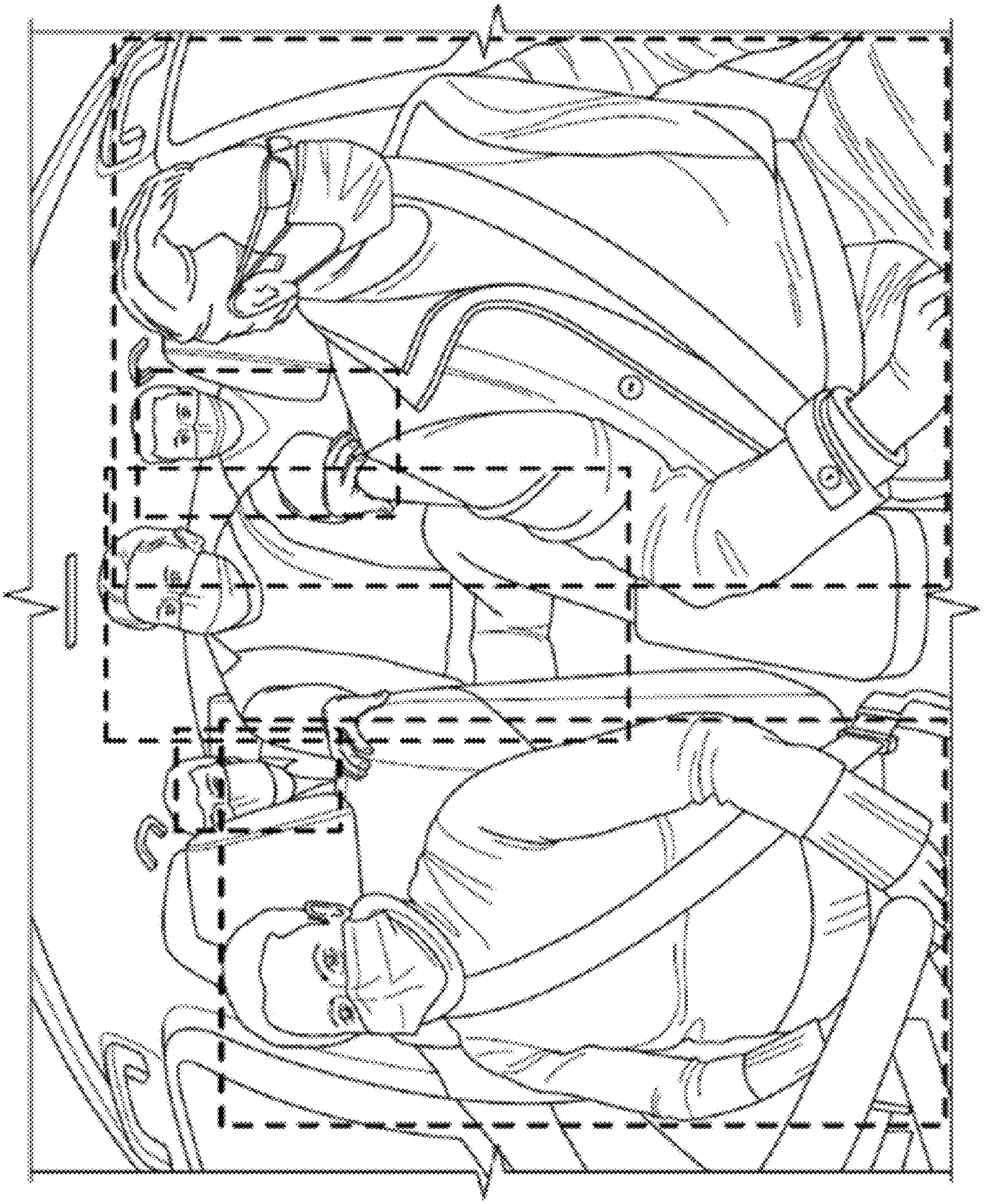
FIG. 4 is an example of object detection in a vehicle.

Various algorithms can be used in the present disclosure such as region classifiers, facial recognition, object detection, body key points, and/or height estimation. For example, in FIG. 2, body key points and/or height estimation maps vehicle occupants. As another example, in FIG. 3, faces of vehicle occupants are detected. As another example, in FIG. 4, image regions that contain a person are identified.

Input Sensors

Figure 5:
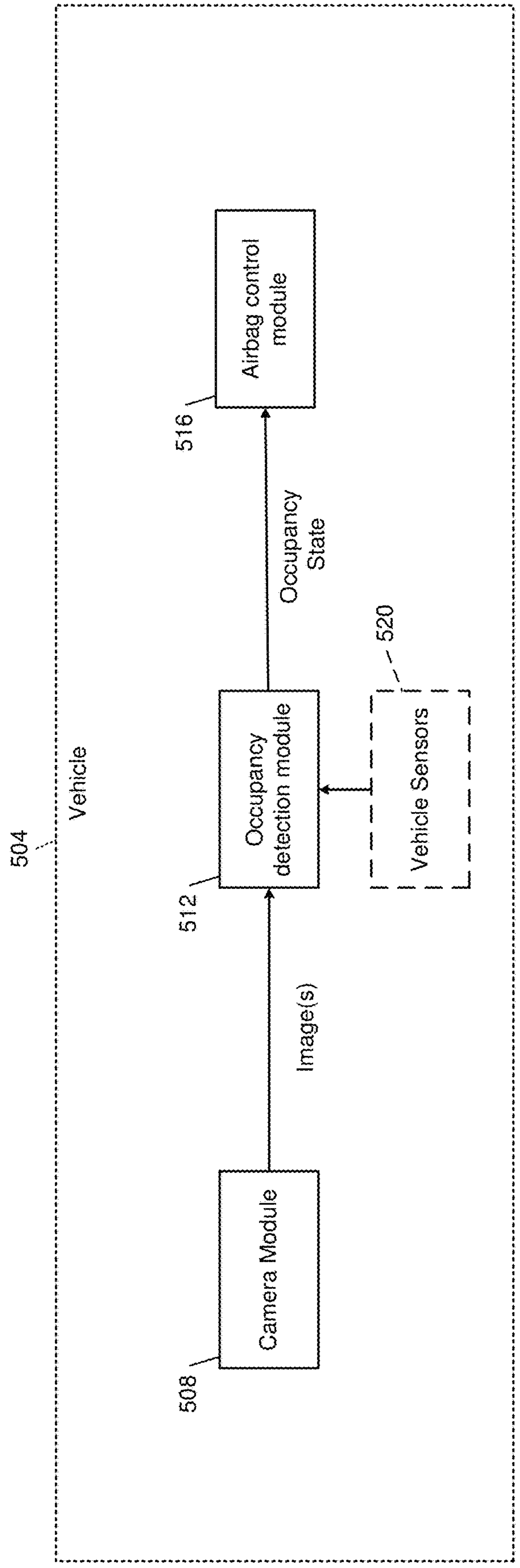
FIG. 5 is a block diagram of an example system for detecting vehicle occupants.

The method described herein uses one or more cameras with a field of view of the interior of the vehicle. FIG. 5 depicts the high-level architecture of the vision-based Passenger Occupant Detection Systems (PODS) algorithm. In FIG. 5, vehicle 504 includes camera module 508, which sends images to occupancy detection module 512. In some implementations, occupancy detection module 512 also relies on data from vehicle sensors 520 (such as door state sensors, vehicle speed sensors, seat belt buckle state sensors, and/or a weight-based sensor). Occupancy detection module 512 sends an occupancy state for seats with an airbag to airbag control module 516, which determines whether to activate each airbag. In some implementations, the one or more cameras of camera module 508 is positioned inside the cabin of a vehicle with a field of view that includes one or more passengers and has visibility of the region around the driver's head and torso. In some implementations, the camera of camera module 508 is an RGB-IR camera with active infrared (IR) illuminators, which can capture RGB Color as well as IR spectrum via a dual bandpass color filter array (CFA) on the imager. However, the proposed method is not limited to a specific color filter array. The proposed method can also be applied to near infrared (NIR) cameras with visible light cut filter and with some adaptation to RGB or monochrome visible light cameras or other types of CFA. IR cameras with active IR illuminators can operate in low ambient light conditions (e.g. at night). The method can further be applied to other imaging sensors such as stereo cameras, time-of-flight cameras, structured light cameras, thermal cameras or similar. The method can be easily extended to multiple cameras.

Occupant Detection Method

Figure 6:
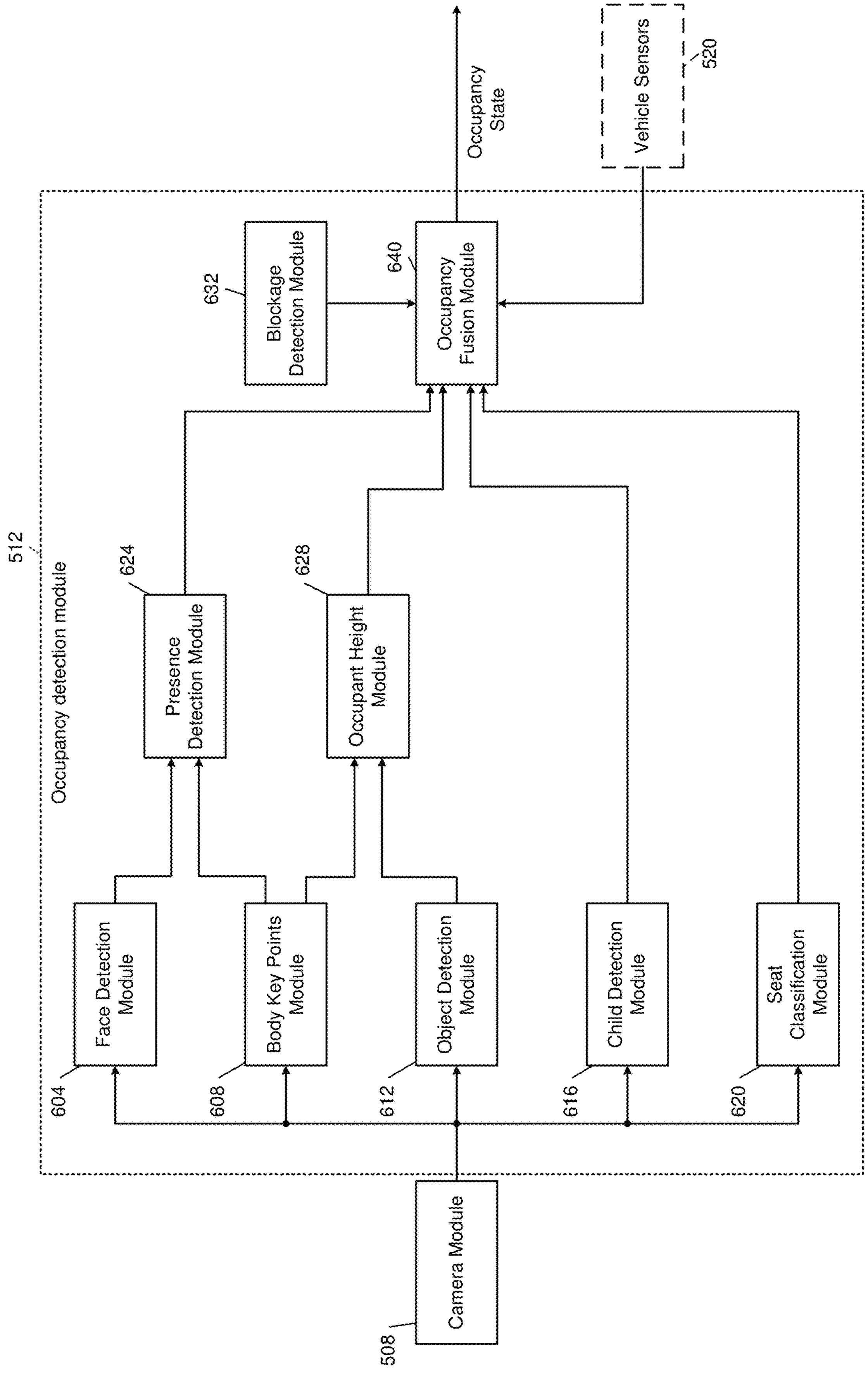
FIG. 6 is a block diagram of an example system for detecting vehicle occupants.
Figure 7:
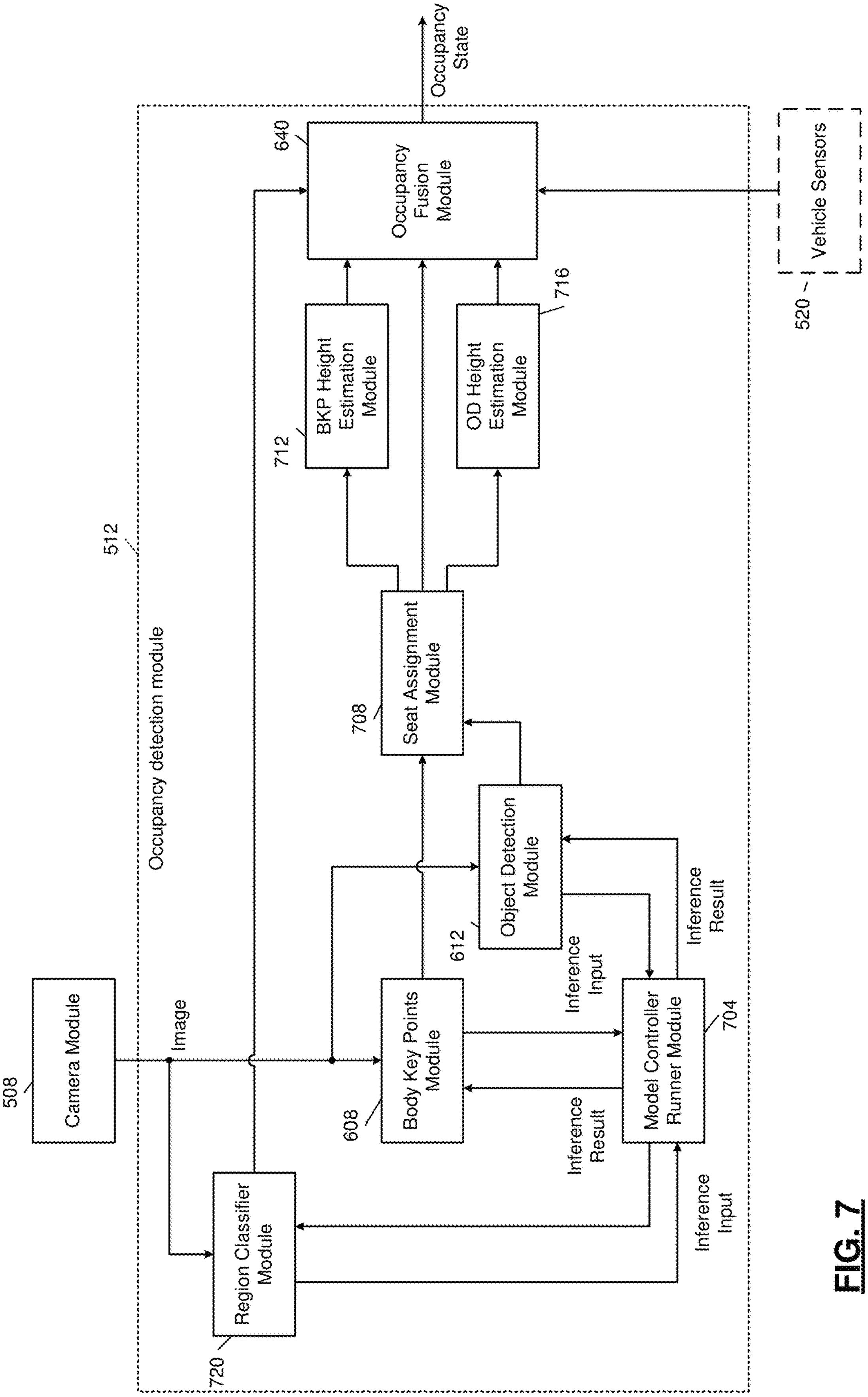
FIG. 7 is a block diagram of an example system for detecting vehicle occupants.

The proposed method relies upon several camera-based detection algorithms to gather information about the vehicle cabin state. However, none of the algorithms individually can fully determine the correct airbag activation state in all relevant conditions. Some methods such as body key points detection actively detect the presence of human subjects, but without further post-processing cannot differentiate between children and adults. The absence of body key points can be a sign of empty seat, but also an object on a seat or a child seat. A second method, such as object detection, can detect empty seats, child seats, or people, but cannot reliably distinguish children from adults. The proposed fusion algorithm combines information from different sources to map the information to the required target output, as depicted in FIGS. 6 and 7. Occupant and object detection algorithms rely on various criteria including facial recognition, height and/or size calculation of objects and/or occupants, the location of a detected object and/or occupant, the similarity of an object to a specific object (e.g., a child safety seat), etc.

FIG. 6 is a functional block diagram of a first example system for detecting vehicle occupants. Camera module 508 sends image data to face detection module 604, body key points module 608, object detection module 612, child detection module 616, and seat classification module 620. In some implementations, seat classification module 620 determines a seat occupancy state such as empty, object on seat, child seat, child, and/or adult. The image data analysis of face detection module 604 and body key points module 608 is sent to presence detection module 624. In some implementations, presence detection module 624 detects the presence of a human person in a seat without classification (i.e., without determining if the person is a child or adult). Image data analysis from body key points module 608 and object detection module 612 is sent to occupant height module 628, which determines the height of objects and occupants to distinguish between adults and children. Data from child detection module 616, seat classification module 620, occupant height module 628, and presence detection module 624 are sent to occupancy fusion module 640 along with data from blockage detection module 632 and optionally data from vehicle sensors 520. Blockage detection module 632 determines whether at least a portion of a field of view associated with camera module 508 is blocked or occluded (e.g., by dirt, sticker, and/or parking permit hanger). In some implementations, if a blockage is detected by blockage detection module 632, a default occupancy state is assumed (such as unoccupied) or a previous occupancy state is assumed. Occupancy fusion module 640 outputs the occupancy state for some seats, all seats with airbags, or a selection of seats in the vehicle.

FIG. 7 is a functional block diagram of a second example system of detection vehicle occupants. In some implementations, the systems described in FIG. 6 and FIG. 7 are combined. In some implementations, elements and modules from one system are used in the other and vice versa. In some implementations, the systems of FIG. 6 and FIG. 7 are combined with the system of FIG. 5. In FIG. 7, camera module 508 sends image data to occupancy detection module 512 including region classifier module 720, body key points module 608, and object detection module 612. Region classifier module 720, body key points module 608, and object detection module 612 send inference inputs into model control runner module 704, which outputs inference results to each module. In some implementations, model control runner module 704 includes underlying compute hardware (such as resources for neural network inference and specific runtime implementations). In some implementations, model control runner module 704 receives processing requests and contains a scheduling mechanism to manage multiple incoming requests. Region classifier module 720 sends image data analysis to occupancy fusion module 640. Body key points module 608 and object detection module 612 send their analysis to seat assignment module 708, which determines which vehicle seat the analysis is associated with. The data analyzed in seat assignment module 708 is sent to body key points height estimation module 712, object detection height estimation module 716, and occupancy fusion module 640. Data from body key points height estimation module 712 and object detection height estimation module 716 is sent to occupancy fusion module 640. Occupancy fusion module combines and analyzes the data from each module (and optionally data from vehicle sensors 520) and outputs the occupancy state. In some implementations, occupancy states include empty (E), object (O), child seat (CS), child in child seat (CCS), child (C), adult (A), and/or person (P) (i.e., a detected occupant of unknown size).

Step One

Figure 8:
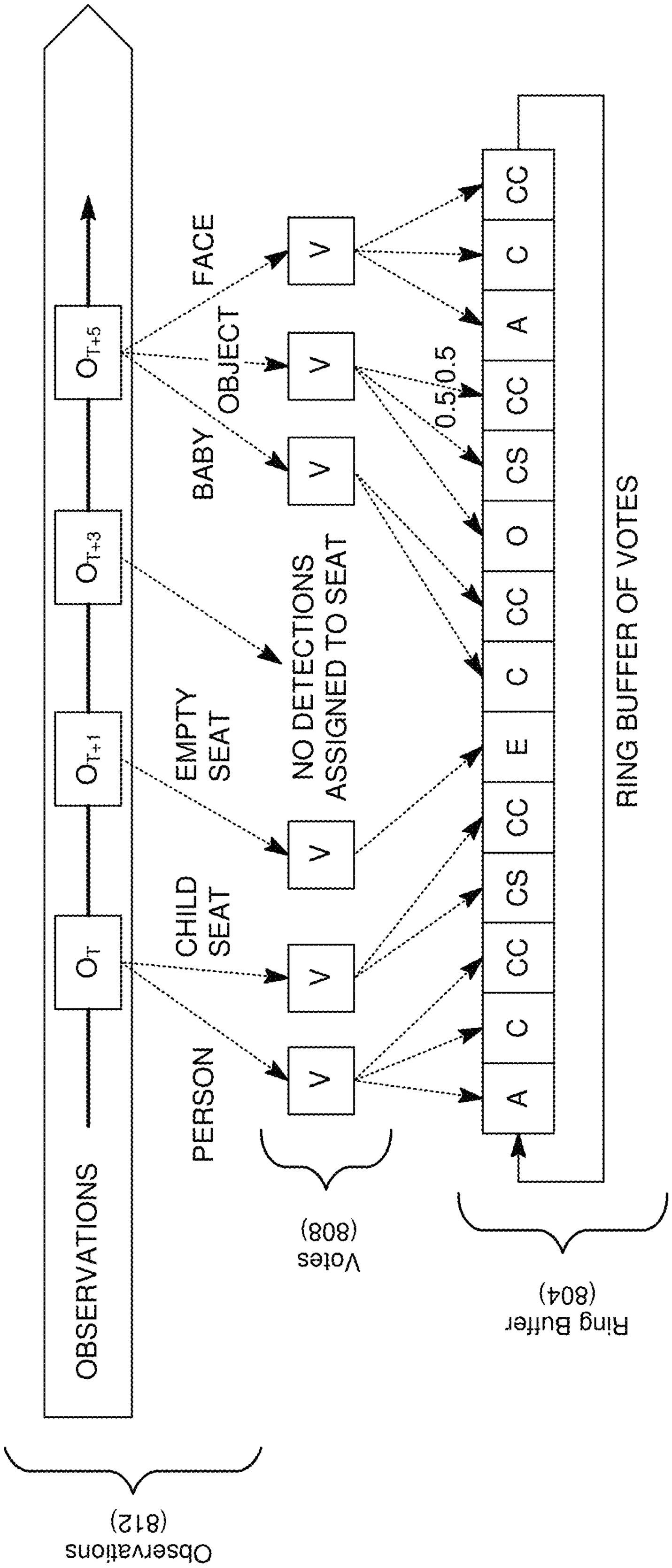
FIGS. 8-10 are diagrams of steps in an example method for detecting vehicle occupants.

The fusion method described below can be split into three distinct steps. In FIG. 8 (i.e., the first step), observations (occupancy algorithm observations) are provided at regular intervals (e.g., every 0.25, 0.5, 1, 5, 10, 30, and/or 60 seconds) from multiple inputs (such as body key points module 608, region classifier module 720, object detection module 612, and/or object detection height estimation module 716). Each input provides observations for each interval. Every input observation counts as a vote for each occupancy state it is compatible with. For example, if object detection module 612 detects a person bounding box, this observation (i.e., the bounding box) is compatible with the adult (A) occupancy state, the child (C) occupancy state, and also the child in child seat (CC) occupancy state.

A single object or person may be categorized in a broader classification (or category) if an associated confidence level is not sufficiently high, even if a more specific class is available. For example, if the object detector (such as object detection module 612) detects a generic (not further classified) object, this may indicate that the object is a laptop, backpack, etc., but there is also a chance that the object is a child seat, even though child seat is an explicit class the object detector can usually identify. For example, if the detected object is a new child seat model that the classifier has not seen yet, the object detector predicts a generic object, because the confidence for the more specific child seat class is too low. In such a case, the fusion algorithm can take this into account by voting for both object (O) and child seat (CS), with a smaller voting weight, (e.g., a voting weight of 0.5 as shown in FIG. 8).

In FIG. 8, votes 808 based on observations 812 from an observation input (such as object detection module 612 or body key points module 608) are accumulated in ring buffer 804 that is overwritten from the beginning again after a configured number of entries have been filled (i.e., only observations/votes below an age threshold are used). In some implementations, each algorithm is associated with a ring buffer. In some implementations, the size of the ring buffer is a property of the algorithm (i.e., based on the execution speed of the algorithm). The ring buffer guarantees that the algorithm generates reproducible results by eliminating and/or ignoring expired votes/observations. For example, after a fixed period of time, a change in the real occupancy state in the vehicle results in a switch of the camera-based fusion occupancy state.

Step Two

Figure 9:
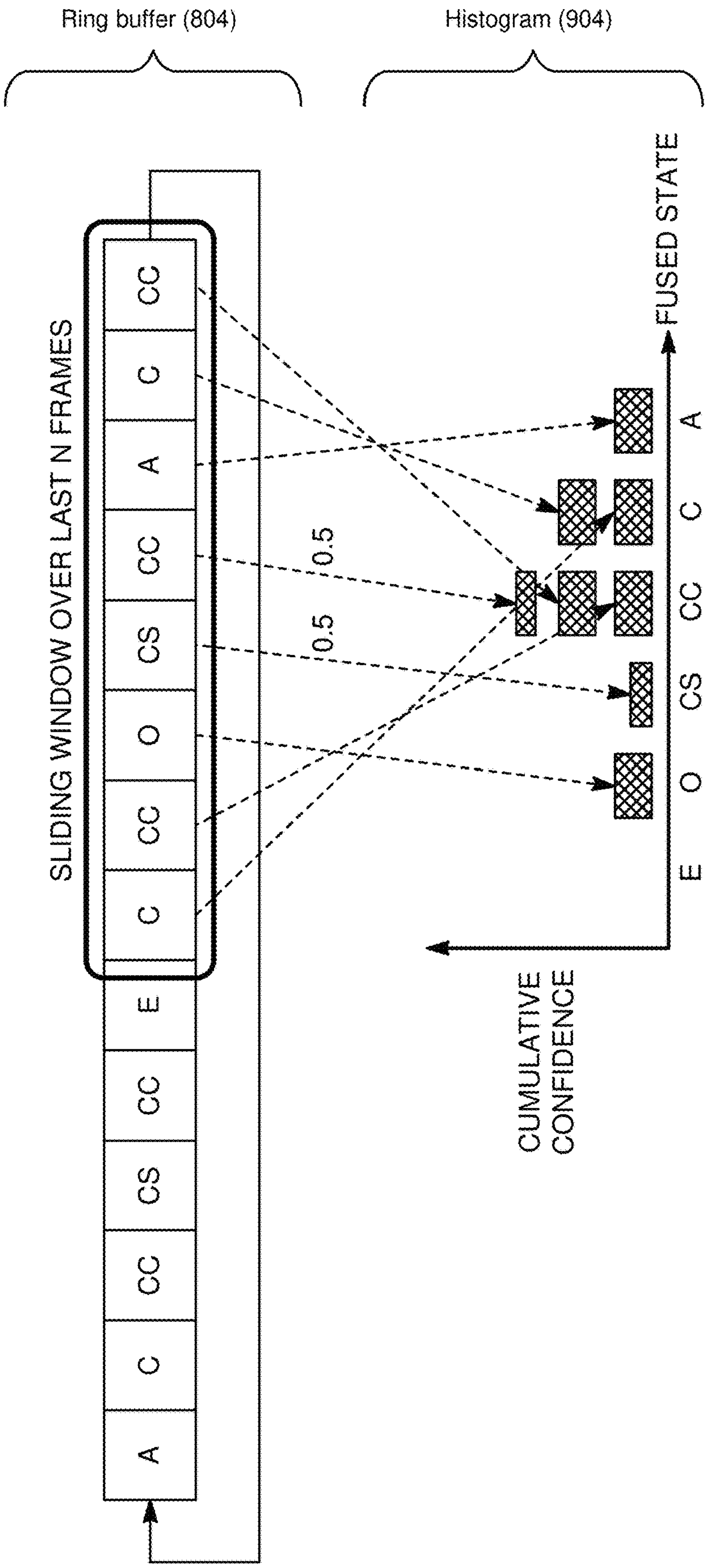

In the second step (as shown in FIG. 9), votes from ring buffer 804 are accumulated into confidence-weighted histogram 904 with fusion occupancy states on the x-axis and confidence per occupancy state on the y-axis. Each vote is defined as a triplet of state, confidence, and time. Only votes that fall inside the pre-defined time window, (e.g., the last N seconds) are considered during that step. This ensures reproducibility. The length of the ring buffer must be large enough to ensure there is always enough memory available in the ring buffer to hold observations from the last N seconds.

Ring buffer size can vary for each input algorithm (e.g., body key points, region classifier, and/or object detector) because (1) each input algorithm might run at different rates (i.e., frames per second and/or observations per second) and (2) one observation can vote for one or more occupancy states. For example, body key points is executed 15 times per second, while region classifier is only executed 5 times per second. Detected body key points can vote for both adult and child, while region classifier typically only votes for one occupancy state per observation.

Step Three

Figure 10:
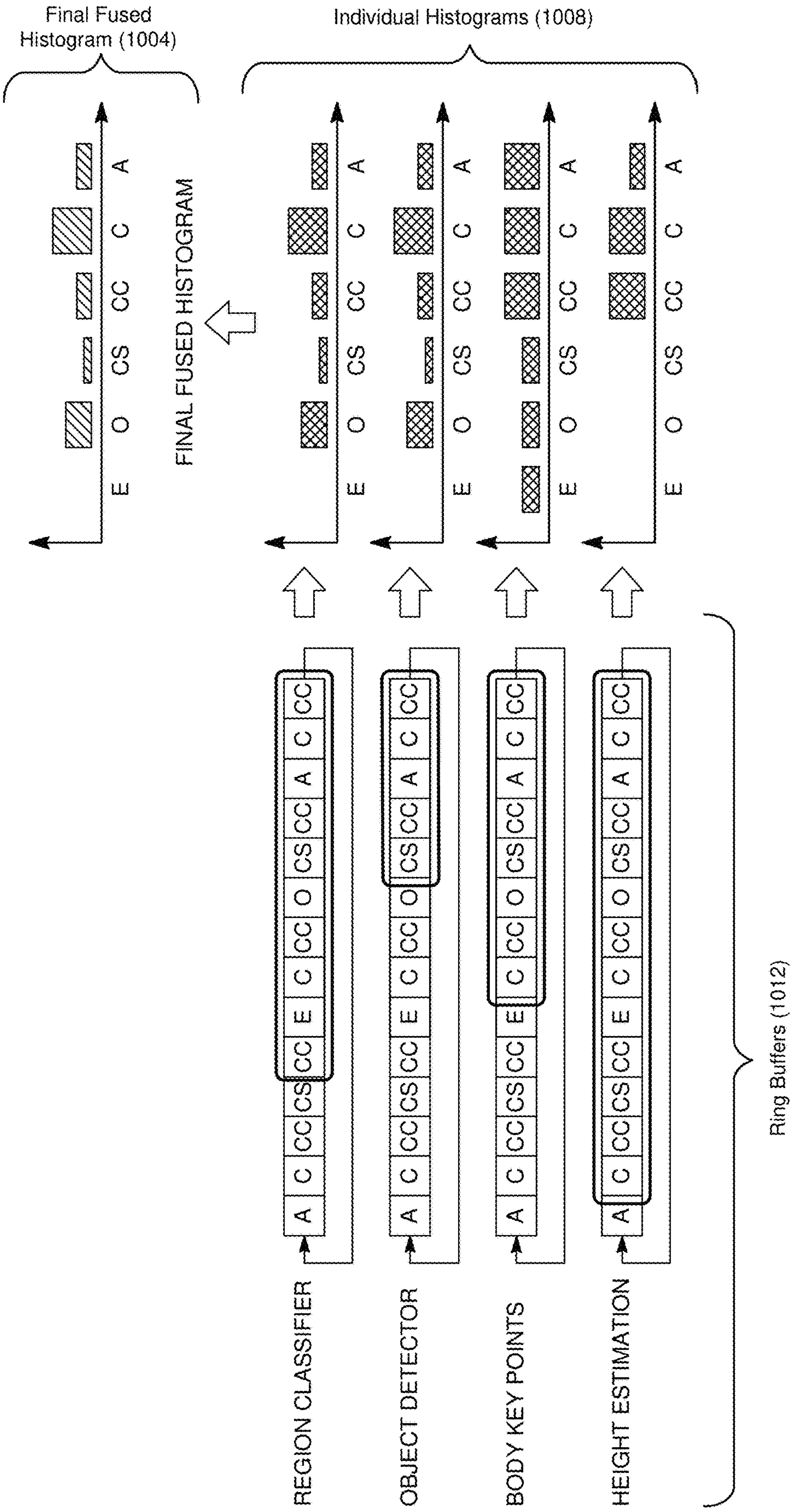

In the third step, as shown in FIG. 10, ring buffers 1012 for each input algorithm (e.g., body key points, region classifier, object detector, and/or height estimation) create individual histograms 1008. Each histogram is normalized individually before all histograms are combined in a weighted manner. This guarantees that no input algorithm has more weight in the decision (for example, because the algorithm was running at a higher execution rate compared to another input algorithm). The proposed procedure allows exact control of the balance between all input algorithms and calibrate the balance (for example, which algorithm to trust more or less, regardless of its configured FPS).

Final fused histogram 1004 contains confidences (or metrics) for all occupancy states (or parameters). In some implementations, final fused histogram 1004 is normalized. The occupancy state with the highest confidence is typically be forwarded as state of the camera-based vision-PODS result (i.e., the occupancy state). The occupancy state is then treated as an "observation" again in a state machine, which is described in greater detail below.

In some implementations, the output of final fused histogram 1004 is an invalid observation. For example, two states (e.g., the two highest confidence states) within the histogram have similar confidence levels, resulting in a competing result. As another example, camera blockage or occlusion causes a seat to not be visible. As another example, no inputs have been received and all confidence values in the histogram are zero. In some implementations, the highest confidence occupancy state must be greater than the second highest confidence occupancy state by a threshold confidence value. In some implementations, if the confidence of the highest confidence occupancy state is not sufficiently high and/or the confidence of the highest confidence occupancy state is not greater than the second highest confidence by the threshold amount, the airbag is deactivated. In some implementations, the current airbag activate state is maintained.

Temporal Stabilization

Figure 11:
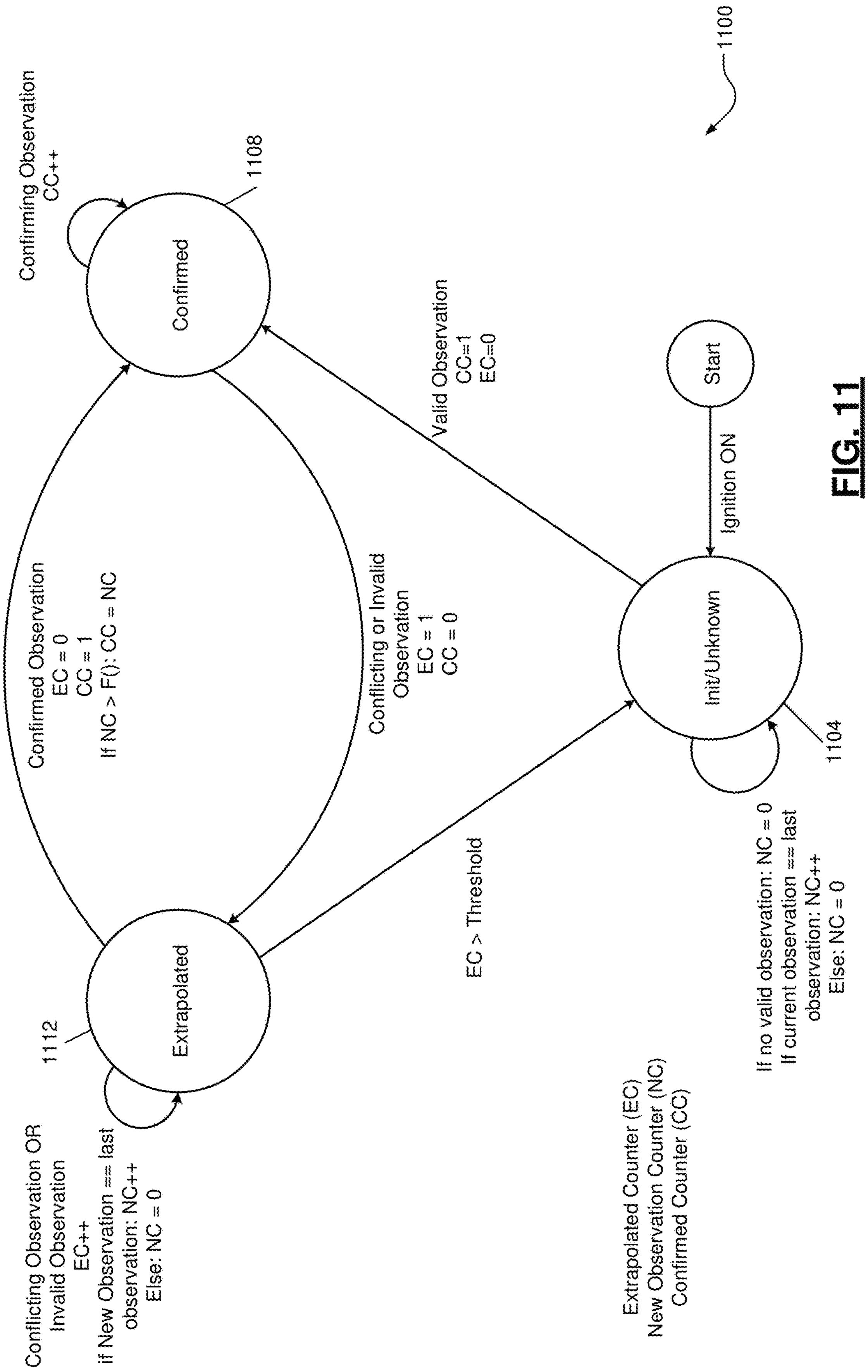
FIG. 11 is a state machine diagram of an example method for stabilizing output of an example system for detecting vehicle occupants.
Figure 12:
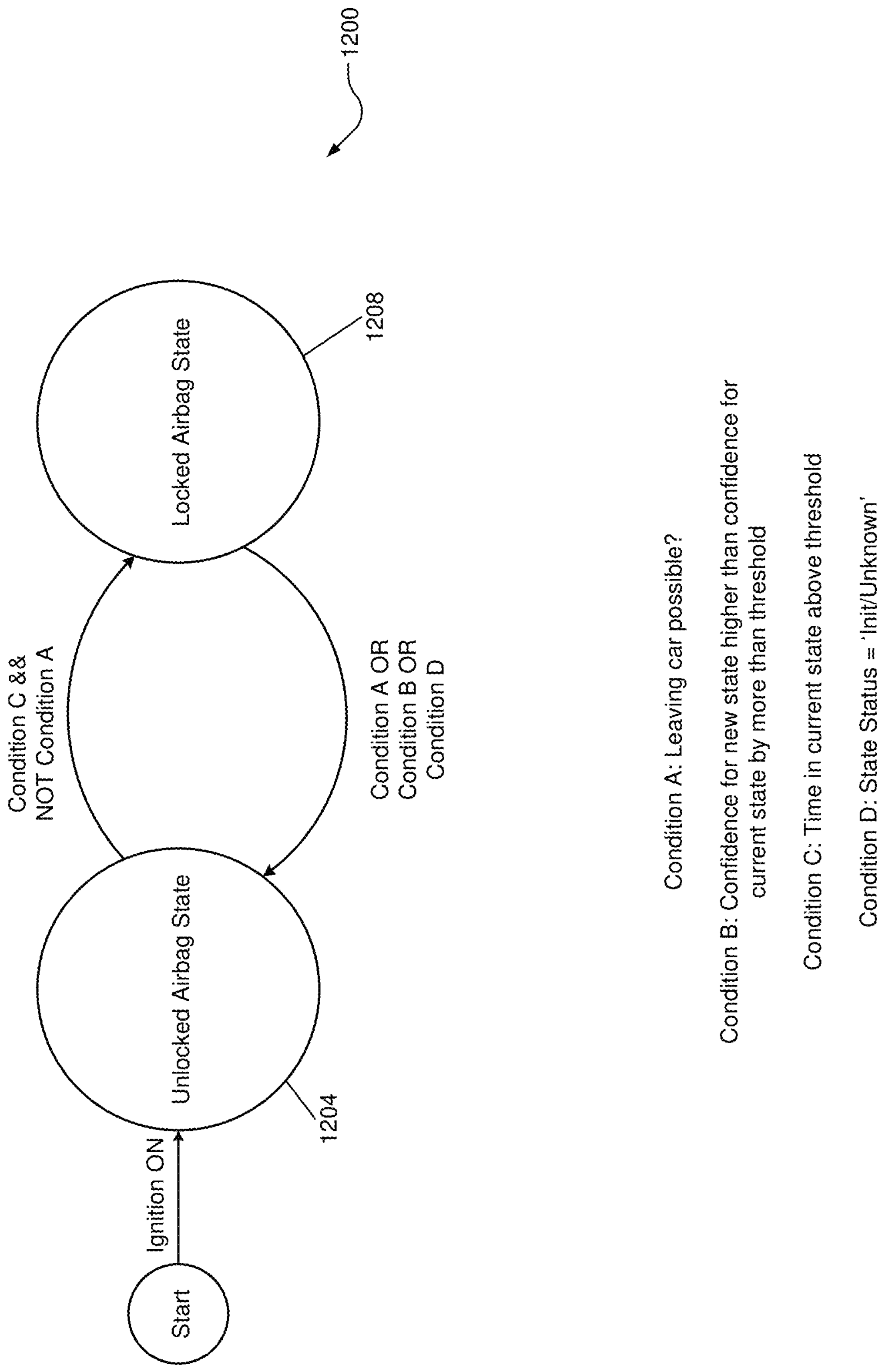
FIG. 12 is a state machine diagram of an example method for overcoming observation shortcomings in an example system for detecting vehicle occupants.

The resulting fused "observations" reflect the status of the system based on short-term history (depending on buffer size). In order to further stabilize the system output, additional cues are incorporated to avoid changes of the airbag activation state based on short-term changes in observed occupancy states. This includes a locking mechanism to block activation state changes in certain conditions. For example, when a vehicle is in motion or the vehicle doors have not opened, it is unlikely that a person has left the vehicle. However, there is a chance that a person may climb from the front seat to the rear seat while the vehicle is in motion, therefore there must be a way to exit the locked airbag state. As shown in FIG. 11, state machine 1100 determines whether various conditions (e.g., the possibility of an occupant leaving the vehicle, confidence of an occupancy state, time, etc.) have been met and if the airbag activation state should be locked or not. In addition to activation state locking, some state machines allow extrapolation of states to overcome short-term missing observations or short-term inconsistent observations, as shown in FIG. 12. These states allow the vehicle to extrapolate the occupancy of a seat and the correct airbag activation state if data is incomplete, incorrect, and/or fluctuating quickly.

FIG. 11 is a state machine diagram of an example method for stabilizing output of an example system for detecting vehicle occupants. In FIG. 11, in response to the vehicle ignition turning on, state machine 1100 proceeds to init/unknown state 1104. At init/unknown state 1104, if there is a valid observation (i.e., an occupancy state output from occupancy fusion module 640), the confirmed counter (CC) is set to one, the extrapolated counter (EC) is set to zero, and state machine 1100 transitions to confirmed state 1108. In some implementations, a valid observation is an observation that is not associated with any errors. In some implementations, a valid observation is a default status. In some implementations, a valid observation describes any observation in which algorithm analysis was completed successfully. In some implementations, if processing or analysis fails for any reason, an observation is invalid.

State machine 1100 remains at init/unknown state 1104 if the previous condition is not met (i.e., a valid observation is not received). If there is no valid observation regarding occupancy of a seat, the new observation counter (NC) is set to zero. If there is no valid observation and if the current observation is equal to (i.e., the same as) the last observation, NC is incremented. If there is no valid observation and the current observation is not the same as the previous observation, NC is set to zero.

At confirmed state 1108, if there is a conflicting or invalid observation, state machine 1100 sets EC to one, CC to zero, and transitions from confirmed state 1108 to extrapolated state 1112. If there is not a conflicting or invalid observation, state machine 1100 remains at confirmed state 1108 and increments CC. In some implementations, a conflicting observation is a valid observation that represents a different occupancy state from the current state. For example, the current occupancy state is "adult" and a newly received observation is "child seat." The opposite of a conflict observation is a confirmed (or confirming) observation. In other words, a confirmed observation confirms the current occupancy state (i.e., it represents an occupancy state that matches the current occupancy state).

At extrapolated state 1112, state machine 1100 transitions to init/unknown state 1104 if EC is greater than a threshold (i.e., if the occupancy state has been unknown or extrapolated for longer than a threshold period). At extrapolated state 1112, state machine 1100 returns to confirmed state 1108 if a confirmed observation (e.g., an occupancy state that matched the occupancy state before the invalid observation) is received and sets EC to zero, CC to one, and if NC is greater than an adaptive threshold function ("F( )"), state machine 1100 sets CC equal to NC.

In some implementations, F( ) is a function of the current occupancy state and the current airbag activation state. In some implementations, some transitions are more likely and thus have a lower threshold requirement (e.g., between classes that all result in a deactivated airbag) and others are less likely and have a higher threshold (e.g., between classes that result in a change of airbag activation state). For example, in some implementations, the threshold from changing from an adult occupancy state to a child seat occupancy state is high (e.g., 10-20 seconds) and the threshold from changing from a child seat occupancy state to an object occupancy state is low (e.g., 1-2 seconds).

If a conflicting or invalid observation is received while at extrapolated state 1112, EC is incremented and NC is set to 0. If a conflicting or invalid observation is received while at extrapolated state 1112 and the new observation is equal to the last observation, NC is incremented. Init/unknown state 1104, confirmed state 1108, and extrapolated state 1112 are used by airbag control module 516 and state machine 1200 (shown in FIG. 12) to determine whether an airbag should be activated.

As an example, state machine 1100 transitions from init/unknown state 1104 to confirmed state 1108 after a valid adult occupancy state observation is received. A second adult occupancy state observation is received (a confirming observation) and state machine 1100 remains at confirmed state 1108. A new child occupancy state observation after the previous adult occupancy state observations (a conflicting observation) is received, and state machine 1100 transitions to extrapolated state 1112. The conflicting observation results in an extrapolated occupancy state (i.e., extrapolating that an adult occupancy state is still true despite an observation that conflicts). The adult occupancy state is maintained (i.e., state machine 1100 remains in extrapolated state 1112) until the threshold is met (EC>threshold) or a new adult observation is received (returning to confirmed state 1108). This reduces unnecessary airbag activation changes and other errors in activation. If child is observed for more than the threshold time in all following consecutive frames, the state machine 1100 transitions to unknown state 1104 (and the occupancy state becomes unknown). If a valid child observation is received at init/unknown state 1104, the occupancy state changes to child, and state machine 1100 transitions to confirmed state 1108.

At FIG. 12, state machine 1200 transitions from start to unlocked airbag state 1204 (e.g., airbag activation state of "on" or "off" can change) when the vehicle ignition turns to on. State machine 1200 relies on several conditions: A) is leaving the vehicle possible (e.g., doors locked, car moving, etc.), B) the confidence of the new occupancy state is higher than the confidence for the current occupancy state by more than a threshold, C) is time in the current occupancy state above a threshold, and D) the state status of state machine 1100 is init/unknown state 1104. State machine 1200 transitions to locked airbag state 1208 if condition C is true and condition A is false. State machine 1200 transitions to unlocked airbag state 1204 from locked airbag state 1208 if conditions A, B, or D are true.

Occlusion Handling

One of the key limitations of a vision-based system is the requirement of line of sight between the seat regions and cameras and/or imaging devices. People or objects occluded by another object (e.g. a blanket) cannot be detected reliably. In some scenarios, for example the state is detected before the occlusion and the previous state is maintained during occlusion. However, in some scenarios, child seats are occluded by a blanket before the system receives data from the camera and therefore the camera never sees the child seats emerge from occlusion. To overcome this obstacle, object detection module 612 is configured and trained to detect instances of blankets (for example using bounding box detection or pixel-wise semantic segmentation). If a blanket is detected on a seat from the very beginning (i.e., the blanket is the only thing in the buffer for that seat region) and no person is visible, the system assumes the correct state is either "blanket on empty seat" or "blanket covering child seat" and both classes would result in airbag OFF state. If a person is detected (resulting in airbag ON state) before being occluded, the ON state would be kept active even if a blanket is detected afterwards.

Other techniques for blanket occlusion include voting for different classes in the object detection vote ring buffer with different confidences. For example, if the blanket area is small and position low, the highest vote confidence is for object class, with lower vote confidences for child or adult. As another example, if the blanket area is large and the blanket position covers the seat from bottom to head rest, zero votes for empty are generated, a low vote for object is generated, and a medium vote is generated for child, child seat, and/or adult. The same concept can be extended to other object classes that allow occlusion of a child seat and/or person.

Occlusions caused by objects nearby the camera or by a sticker that limits the line of sight and does not allow for proper detection and classification of seat occupancy state are detected by blockage detection module 632. If camera blockage is detected for the full image, or significant overlap with a seat region in the image, blockage detection module 632 signals the blockage and the system switches to a safe fallback state (e.g. airbag off) if blockage is present for some configurable time. Short term camera blockage can be ignored via the state machine logic (extrapolation state).

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including “connected,” “engaged,” “coupled,” “adjacent,” “next to,” “on top of,” “above,” “below,” and “disposed.” Unless explicitly described as being “direct,” when a relationship between first and second elements is described in the above disclosure, that relationship encompasses a direct relationship where no other intervening elements are present between the first and second elements as well as an indirect relationship where one or more intervening elements are present between the first and second elements.

As noted below, the term “set” generally means a grouping of one or more elements. However, in various implementations a “set” may, in certain circumstances, be the empty set (in other words, the set has zero elements in those circumstances). As an example, a set of search results resulting from a query may, depending on the query, be the empty set. In contexts where it is not otherwise clear, the term “non-empty set” can be used to explicitly denote exclusion of the empty set—that is, a non-empty set will always have one or more elements.

A “subset” of a first set generally includes some of the elements of the first set. In various implementations, a subset of the first set is not necessarily a proper subset: in certain circumstances, the subset may be coextensive with (equal to) the first set (in other words, the subset may include the same elements as the first set). In contexts where it is not otherwise clear, the term “proper subset” can be used to explicitly denote that a subset of the first set must exclude at least one of the elements of the first set. Further, in various implementations, the term “subset” does not necessarily exclude the empty set. As an example, consider a set of candidates that was selected based on first criteria and a subset of the set of candidates that was selected based on second criteria; if no elements of the set of candidates met the second criteria, the subset may be the empty set. In contexts where it is not otherwise clear, the term “non-empty subset” can be used to explicitly denote exclusion of the empty set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term “module” can be replaced with the term “controller” or the term “circuit.” In this application, the term “controller” can be replaced with the term “module.” The term “module” may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); processor hardware (shared, dedicated, or group) that executes code; memory hardware (shared, dedicated, or group) that is coupled with the processor hardware and stores code executed by the processor hardware; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module. The term memory hardware is a subset of the term computer-readable medium.

The apparatuses and methods described in this application may be partially or fully implemented by a special-purpose computer created by configuring a general-purpose computer to execute one or more particular functions embodied in computer programs. Such apparatuses and methods may be described as computerized or computer-implemented apparatuses and methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special-purpose computer, device drivers that interact with particular devices of the special-purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A system for controlling an airbag of a vehicle, the system comprising:
- memory hardware configured to store instructions; and
- processor hardware configured to execute the instructions, wherein the instructions include:
  - receiving data from a set of sensors, wherein:
    - the set of sensors includes a set of cameras,
    - the data includes image information, acquired by the set of cameras, of a sensor detection area, and
    - a portion of the sensor detection area includes a deployment zone of the airbag,
  - based on the data, determining whether an occluding object occludes the portion of the sensor detection area, wherein determining whether the occluding object occludes the portion of the sensor detection area includes determining whether a flexible covering is currently present in the deployment zone of the airbag, and
  - in response to a determination that the occluding object occludes the portion of the sensor detection area:
    - selecting a set of previous occupancy states acquired since a time threshold, wherein the set of previous occupancy states is associated with the deployment zone of the airbag, and in response to a determination that the set of previous occupancy states does not include at least one previous occupancy state with a first occupancy value, deactivating the airbag, wherein the first occupancy value indicates that the deployment zone of the airbag is occupied by an adult.

2. The system of claim 1 wherein a second occupancy value indicates that the deployment zone of the airbag is unoccupied.

3. The system of claim 1 wherein a second occupancy value indicates that the deployment zone of the airbag is occupied by a child seat or a child.

4. The system of claim 1 wherein determining whether the flexible covering is currently present in the deployment zone of the airbag includes determining whether a blanket is currently present in the deployment zone of the airbag.

5. The system of claim 1 wherein the instructions include determining a current occupancy state by determining whether the occluding object covers at least a portion of:

an object within the vehicle,
a child within the vehicle, or
an adult within the vehicle.

6. The system of claim 1 wherein the set of previous occupancy states contains n consecutive occupancy states immediately prior to a current occupancy state.

7. The system of claim 6 wherein n is 1.

8. The system of claim 1 wherein the instructions include determining a current occupancy state by:

determining a first score associated with the first occupancy value for the set of previous occupancy states,
determining a second score associated with a second occupancy value for the set of previous occupancy states,
comparing the first score and the second score,
in response to a determination that the first score is greater than the second score, setting the current occupancy state to the first occupancy value, and
in response to a determination that the second score is greater than the first score, setting the current occupancy state to the second occupancy value.

9. The system of claim 1 wherein the time threshold is defined by at least one of:

a vehicle ignition event, or
a set of sensor data.

10. The system of claim 9 wherein the set of sensor data includes at least one of:

an indication of whether the vehicle is in motion,
an indication of whether a set of vehicle doors have opened since the time threshold,
an indication of whether the set of vehicle doors are locked,
an indication of whether a threshold weight has been detected in the deployment zone of the airbag, or
an indication of whether a seatbelt is active in the deployment zone of the airbag.

11. The system of claim 1 wherein the instructions include, in response to a determination that the set of previous occupancy states includes at least one previous occupancy state with the first occupancy value, maintaining an active state of the airbag.

12. A non-transitory computer-readable storage medium comprising processor-executable instructions for controlling an airbag of a vehicle, wherein the instructions include:

receiving data from a set of sensors, wherein:
the set of sensors includes a set of cameras,
the data includes image information, acquired by the set of cameras, of a sensor detection area, and
a portion of the sensor detection area includes a deployment zone of the airbag,
based on the data, determining whether an occluding object occludes the portion of the sensor detection area, wherein determining whether the occluding object occludes the portion of the sensor detection area includes determining whether a flexible covering is currently present in the deployment zone of the airbag, and
in response to a determination that the occluding object occludes the portion of the sensor detection area:
selecting a set of previous occupancy states acquired since a time threshold, wherein the set of previous occupancy states is associated with the deployment zone of the airbag, and
in response to a determination that the set of previous occupancy states does not include at least one previous occupancy state with a first occupancy value, deactivating the airbag, wherein the first occupancy value indicates that the deployment zone of the airbag is occupied by an adult.

13. The non-transitory computer-readable storage medium of claim 12 wherein the instructions include determining a current occupancy state by determining whether the occluding object covers at least a portion of:

an object within the vehicle,
a child within the vehicle, or
an adult within the vehicle.

14. The non-transitory computer-readable storage medium of claim 12 wherein:

the time threshold is defined by at least one of:
a vehicle ignition event, or
a set of sensor data that includes at least one of:
an indication of whether the vehicle is in motion,
an indication of whether a set of vehicle doors have opened since the time threshold,
an indication of whether the set of vehicle doors are locked,
an indication of whether a threshold weight has been detected in the deployment zone of the airbag, or
an indication of whether a seatbelt is active in the deployment zone of the airbag.

15. The non-transitory computer-readable storage medium of claim 12 wherein the instructions include, in response to a determination that the set of previous occupancy states includes at least one previous occupancy state with the first occupancy value, maintaining an active state of the airbag.

16. A method for controlling an airbag of a vehicle, the method comprising:

receiving data from a set of sensors, wherein:
the set of sensors includes a set of cameras,
the data includes image information, acquired by the set of cameras, of a sensor detection area, and
a portion of the sensor detection area includes a deployment zone of the airbag,
based on the data, determining whether an occluding object occludes the portion of the sensor detection area, wherein determining whether the occluding object occludes the portion of the sensor detection area includes determining whether a flexible covering is currently present in the deployment zone of the airbag, and
in response to a determination that the occluding object occludes the portion of the sensor detection area:

selecting a set of previous occupancy states acquired since a time threshold, wherein the set of previous occupancy states is associated with the deployment zone of the airbag, and in response to a determination that the set of previous occupancy states does not include at least one previous occupancy state with a first occupancy value, deactivating the airbag, wherein the first occupancy value indicates that the deployment zone of the airbag is occupied by an adult.

17. The method of claim 16 further comprising determining a current occupancy state by determining whether the occluding object covers at least a portion of:

an object within the vehicle, a child within the vehicle, or an adult within the vehicle.

18. The method of claim 16 wherein:

the time threshold is defined by at least one of:

a vehicle ignition event, or a set of sensor data that includes at least one of:

an indication of whether the vehicle is in motion, an indication of whether a set of vehicle doors have opened since the time threshold, an indication of whether the set of vehicle doors are locked, an indication of whether a threshold weight has been detected in the deployment zone of the airbag, or an indication of whether a seatbelt is active in the deployment zone of the airbag.

19. The method of claim 16 further comprising, in response to a determination that the set of previous occupancy states includes at least one previous occupancy state with the first occupancy value, maintaining an active state of the airbag.

20. The system of claim 1 wherein determining whether the occluding object occludes the portion of the sensor detection area includes:

determining a first metric based on a first quantity of votes from a plurality of detection methods, determining a second metric based on a second quantity of votes from the plurality of detection methods, wherein:

the first metric is associated with a first object type, and the second metric is associated with a second object type, comparing the first metric and the second metric, in response to a determination that the first metric is greater than the second metric, determining that the occluding object occludes the portion of the sensor detection area, and in response to a determination that the second metric is greater than the first metric, determining that the occluding object does not occlude the portion of the sensor detection area.

21. The non-transitory computer-readable storage medium of claim 12, wherein determining whether the occluding object occludes the portion of the sensor detection area includes:

determining a first metric based on a first quantity of votes from a plurality of detection methods, determining a second metric based on a second quantity of votes from the plurality of detection methods, wherein:

the first metric is associated with a first object type, and the second metric is associated with a second object type, comparing the first metric and the second metric, in response to a determination that the first metric is greater than the second metric, determining that the occluding object occludes the portion of the sensor detection area, and in response to a determination that the second metric is greater than the first metric, determining that the occluding object does not occlude the portion of the sensor detection area.

22. The method of claim 16 wherein determining whether the occluding object occludes the portion of the sensor detection area includes:

determining a first metric based on a first quantity of votes from a plurality of detection methods, determining a second metric based on a second quantity of votes from the plurality of detection methods, wherein:

the first metric is associated with a first object type, and the second metric is associated with a second object type, comparing the first metric and the second metric, in response to a determination that the first metric is greater than the second metric, determining that the occluding object occludes the portion of the sensor detection area, and in response to a determination that the second metric is greater than the first metric, determining that the occluding object does not occlude the portion of the sensor detection area.

* * * * *